April 8, 1969 R. H. WILKES 3,437,251
SEGMENTED WELD BACKING BAR
Filed Feb. 21, 1967 Sheet 4 of 4
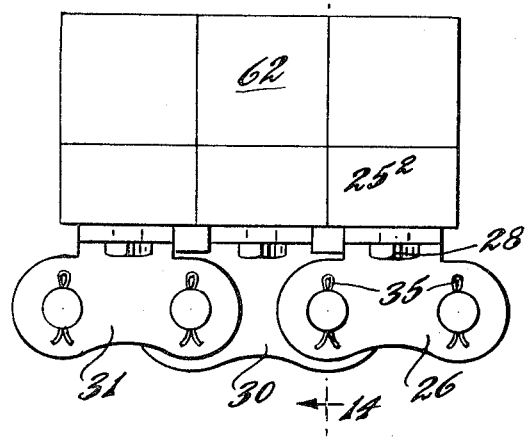
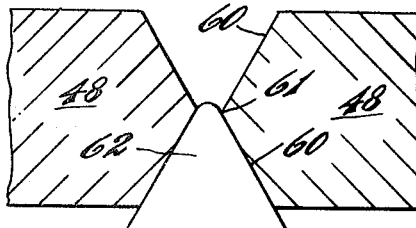
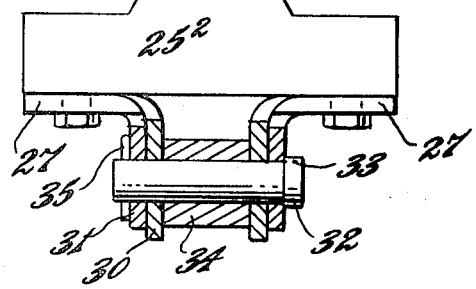
INVENTOR.
Raymond H. Wilkes
BY
ATTORNEYS United States Patent Office 3,437,251
Patented Apr. 8, 1969

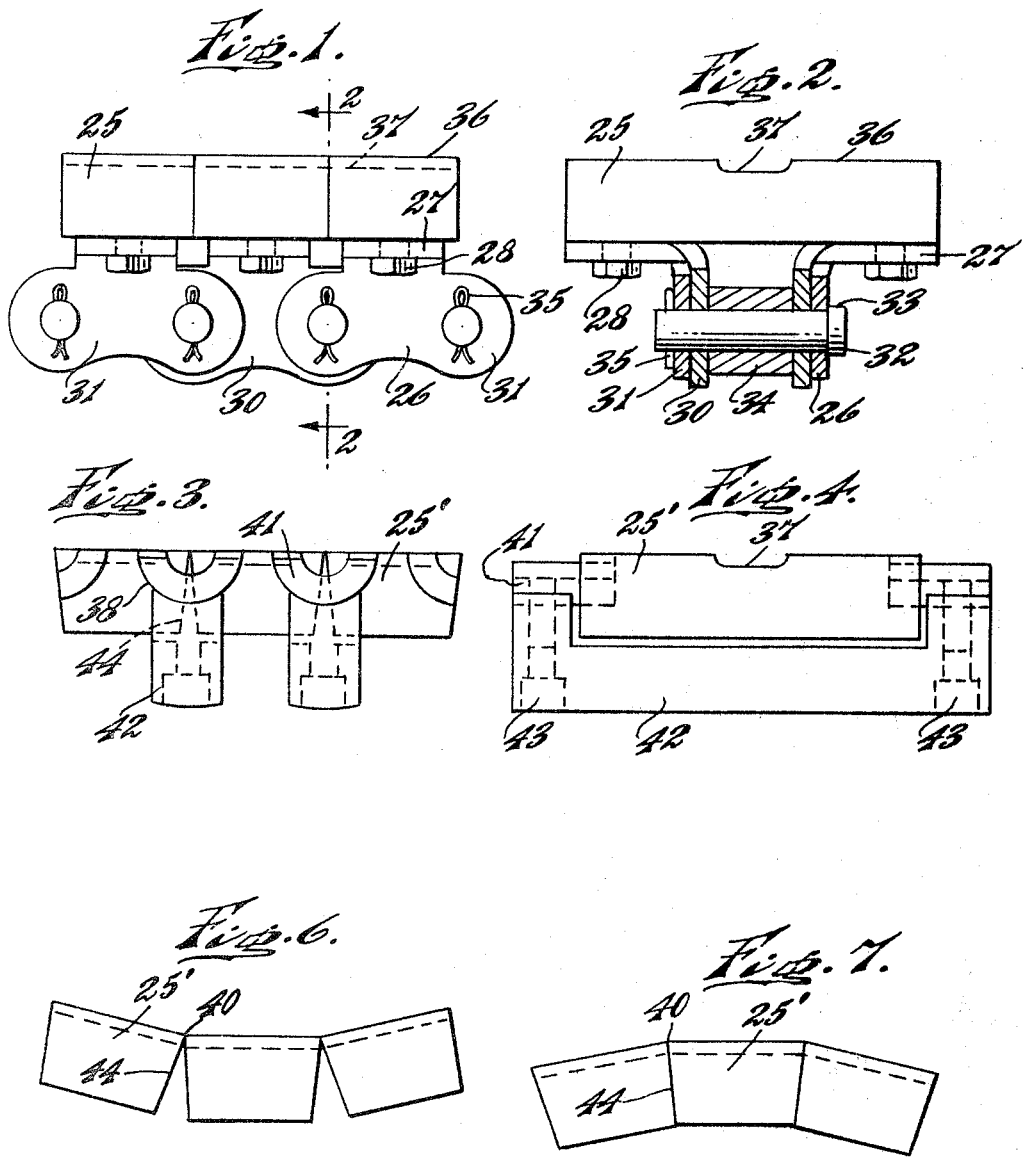

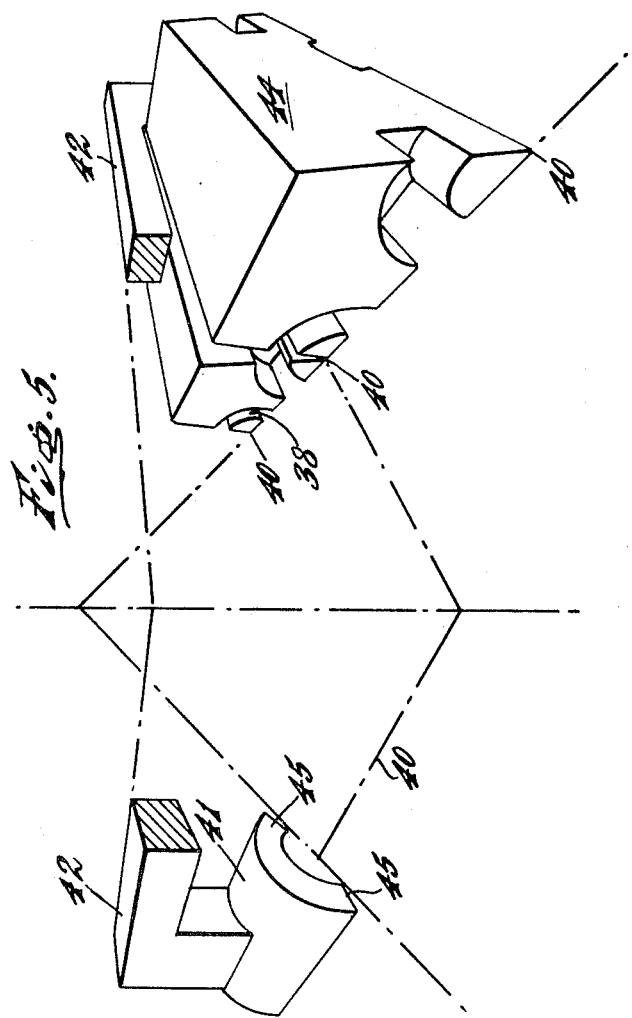

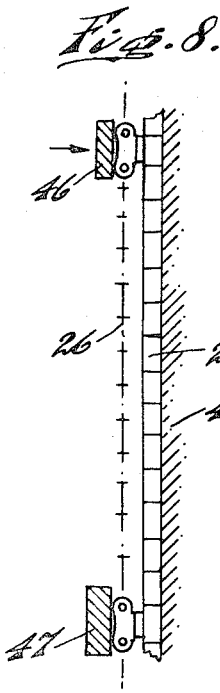
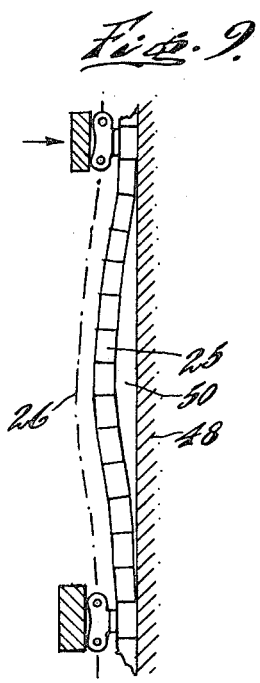
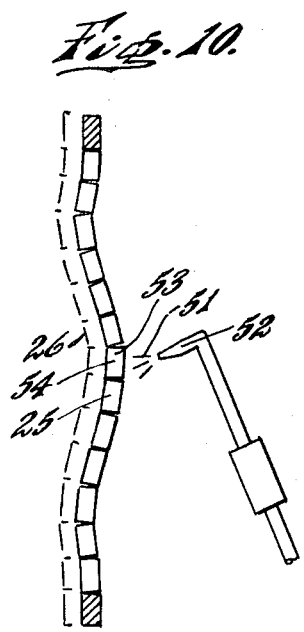
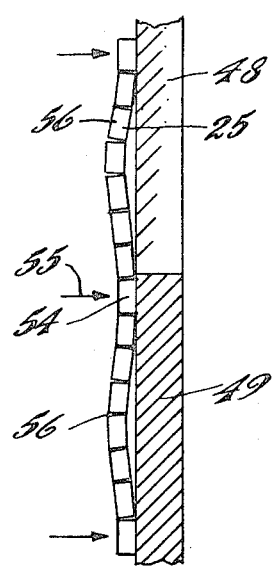
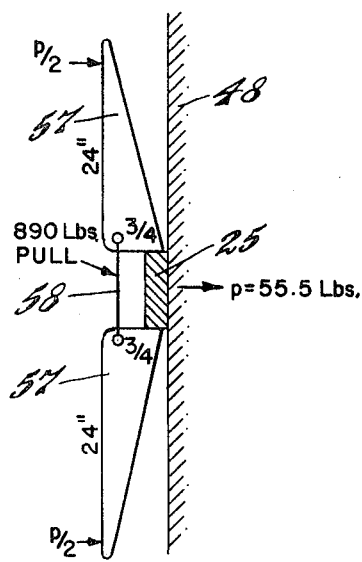

3,437,251
SEGMENTED WELD BACKING BAR
Raymond H. Wilkes, Chester, Pa., assignor to Arcos Corporation, Philadelphia, Pa., a corporation of Pennsylvania
Filed Feb. 21, 1967, Ser. No. 617,705
Int. Cl. B23k 5/22, 9/02
U.S. Cl. 228—50          8 Claims

ABSTRACT OF THE DISCLOSURE

The disclosure relates to a segmented weld backing bar for retaining weld metal and slag in joining metallic plates by fusion welding, which comprises articulated segments of heat conducting or refractory material which are held by a support and able to accommodate deviations in plate dimensions and position. The support may be a chain such as a roller chain. In one form the segments meet at the face adjoining the hot metal and pivot around an axis corresponding to the point of meeting, preferably being held by tubular inserts fitting in annular grooves. In one embodiment the segments are of a metal of higher linear expansion than the support so as to press against the plates. In another form, the segments are supported by flexible cables.

---

The present invention relates to weld backing bars which are adapted to adjust to differences in plate dimensions and position.

A purpose of the invention is to engage the molten metal and slag by articulated segments of heat conductive or refractory material which are mounted for adjustment in position on a support.

A further purpose is to mount the segments on a flexible support such as a chain, or flexible cables.

A further purpose is to make the segments engage at points adjoining the molten metal and to pivot the segments around an axis extending through such points of engagement.

A further purpose is to pivot the segments by tubular inserts engaging in annular grooves.

A further purpose is to make the segments of a metal of relatively high heat expansion such as copper and the support of a metal of lower heat expansion such as steel.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

FIGURE 1 is a side elevation of a preferred form of segmented backing bar of the invention, showing only a short portion of the length of the backing bar.

FIGURE 2 is a section on the line 2—2 of FIGURE 1.

FIGURE 3 is a side elevation of a variation of the backing bar of the invention, the device being free curving within its limits of motion.

FIGURE 4 is an end elevation of the backing bar of FIGURE 3.

FIGURE 5 is an exploded perspective of the combination of segments and links shown in FIGURES 3 and 4, illustrating one of the links broken away and showing parts of two of the segments.

FIGURE 6 is a diagrammatic side elevation of the device of FIGURES 3 to 5 showing the segments in a position to fit against the convex root of a concave joint, and eliminating the details of the segments as well as the links.

FIGURE 7 is a side elevation similar to FIGURE 6 showing the segments in a position which will fit against the concave root of a convex joint.

FIGURE 8 shows in diagrammatic side elevation, with a vertical section of the bar, the attachment of a segmented bar of FIGURES 1 and 2 against a joint between two vertical plates.

FIGURE 9 is an elevation similar to FIGURE 8 showing the segmented bar designed with free concavity of the blocks.

FIGURE 10 is a diagrammatic elevation similar to FIGURES 8 and 9 showing the effect of local heating on the shape of the bar.

FIGURE 11 is an elevation similar to FIGURE 8 showing how the alignment forced upon the bar by the plates causes pressure of the segments at the location of the weld.

FIGURE 12 is a diagram showing a hypothetical combination of structural elements which simulate the function of the backing bar of FIGURE 8, useful in calculating the force on the plates at the weld.

FIGURE 13 is a side elevation of a modified backing bar according to FIGURE 1, having nose-shaped segments.

FIGURE 14 is a section of FIGURE 13 on the line 14—14, including also the plates in order to show the application of the nose-shaped segments of the plates.

FIGURE 15 is a modified device of the invention provided with nose-shaped segments, the view being in fragmentary side elevation.

FIGURE 16 is a section on the line 16—16 of FIGURE 15.

FIGURE 17 is a side elevation showing length adjustments being made in the chain of FIGURES 15 and 16.

Weld backing bars made of copper and other materials have been used for a number of years where welding is done from one side only and full penetration welds and weld reenforcement are desired on the side to which the backing bar is attached.

With the introduction of vertical automatic welding, stationary backing bars made of a continuous piece have presented a number of problems, chief of which is to fit a long piece of copper or other backing material to vertical plates which, at times, are not perfectly flush because of the difficulty of fitting-up plates in field erection.

In addition to poor fit-up, the plates are frequently bowed intentionally or unintentionally which further complicates the use of a continuous one-piece backing bar.

In the present invention, a backing bar has been produced which overcomes these problems and offers distinct advantages.

The segments, which are preferably made of pure copper or a copper base alloy such as beryllium-copper, are attached in adjoining relation in perfect alignment, as by a chain or flexible cable. The chain where used permits any link to be removed easily to adapt the length of the bar exactly to the length of the joint or to fit between obstructions such as stiffeners. Enough side play is provided to permit each segment of the backing bar to contour the plates whether they are misaligned or bowed.

It is possible to add links readily to the chain or to subtract links from it by operations which can be performed in the field.

The segmented construction aids in dissipation of heat generated by the electric arc and heated weld metal as there is only a small amount of heat transferred from one segment to the other. This is different from a continuous weld backing bar which becomes hot over the entire length in a short time. Also, a continuous weld backing bar when used must be carefully fitted and wedged solidly into engagement with the plates being welded, as otherwise the heat of welding will warp the bar and cause it to pull away from the workpiece, thus causing weld stoppage or a weld run-out. The segmented backing bar of the present invention can be held to the workpiece by simple U-shaped magnetic clamps as well known.

It has been found that, while vertically welding by the electroslag or electrogas process, the temperatures reached by the various segments are as follows:

|  | ° F. |
|---|---|
| Block facing and in contact with the weld pool | 750 |
| Block immediately above the block facing and in contact with the weld pool, subject to radiation from weld pool but not in contact with it | 150–200 |
| Block immediately below the block facing and in contact with weld pool | 500–650 |

On the other hand, a continuous copper backing bar reaches a temperature of about 750° F. throughout.

Thus the segmented blocks have more reserve heat absorbing capacity than a continuous backing bar, and it is possible in many cases to avoid water cooling them.

Due to the segmented nature of the proposed weld backing bar as herein described, individual segments can easily be replaced on the job when they become damaged or worn out.

Because the segments are held together by flexible means such as chains, and because the bar is not in a single piece, ease of handling, storage and shipping are greatly simplified.

In the preferred embodiment shown in FIGURES 1 and 2, each copper segment 25 is a generally rectangular block, having suitably rectangular faces. The segments 25 are supported by a roller chain 26 which may desirably be a 1-inch #80 standard roller chain using double K–1 bent attachments 27 on all links, which are united to the segments by hardened self-tapping screws 28. The chain conveniently consists of roller links 30 joined by connector links 31, there being at each connection point a pin 32 which is slightly headed at one end 33, which passes through the links and through a roller 34 in the middle, and which is held as by a cotter pin 35 passing through a suitable opening on the opposite side of the chain.

The width of the copper segments 25 is adjusted so that it is the same as the pitch of the chain. It is preferable to use connecting chain links which require no pressure for removal or assembly in the field.

All of the segments are preferably milled on their operating faces 36 which retain the liquid metal and slag, to provide a continuous central depression or recess 37 which will mold the desired reenforcement of the weld. A preferred size for the recess 18 in many cases is ½-inch wide, ³⁄₃₂-inch deep and provided with curved fillets of ⁵⁄₃₂-inch radius tangent to the bottom of the groove.

Standard roller chains possess both lateral and twisting flexibility to a degree sufficient to secure good contact on normal or poorly fitted joints of straight line configuration. It is very desirable not to have the segments wider than the pitch of the chain so that the segmented bar can straighten out when lying flat on a plate or other plane surface. For abnormally tortuous joint configurations, special roller chains known in the trade as "Side Bow" chains will be preferred as they allow extra clearances.

In producing cylinders, shells, spheres and other curved surfaces, another form of segmented link connection is preferred, as shown in FIGURES 3 to 7. In this form, the segments are designed to rotate around their line of mutual contact on the face which contains the liquid metal or slag of the welding pool. In this case any bending of the chain, inward or outward, is not only possible, but more important, tightness between segments is retained and binding is prevented.

In the device under consideration, each of the segments 25' has at both ends adjoining each side a portion (slightly less than ¼ circle) of a circular pivot groove 38 which is coaxial with the meeting edge 40 at the active face where two segments contact. Close fitting tubular inserts 41 (slightly less than ½ of the circumference) enter the circular groove of two adjoining segments, thus holding the segments together and these tubular inserts are joined together by a link 42 extending across from end to end of the inserts with clearance behind them, the links being united at the ends to the tubular inserts by screws 43.

In order to allow for deflection in the segments with respect to a straight line, the abutting faces 44 of the segments are machined so that the included angle will be somewhat less than a right angle, preferably of the order of five degrees less at each side, so as to allow for adequate pivoting of the segments. Likewise, the ends of the inserts at 45 are machined so that their angle to one another about the axis 40 will be somewhat less than 180°, for example, of the order of 170°.

It will be evident that when the segments are adjusted to fit the joints in the plates, a straight solid bar can be used to engage the backs of the links 42 and exert an even pressure on the segmented bar through the links, the solid bar being held in any suitable way as by magnets, wedges, braces or otherwise.

In FIGURE 6, the segments are shown diagrammatically positioned externally of a circular joint or suitably similarly curved joint which is being welded from the inside, an example being a mine shaft lining. The combination of the segments and the links 42 which in effect comprise a chain can be pulled tight at the ends, exerting uniform pressure of all the segments against the cylinder or other curved work.

In FIGURE 7 the reverse condition is shown, the segments 25' being oriented to form the inside of a circular or similarly curved joint being welded from the outside, as in fabrication of cylinders or shells. The abutting surfaces 44 of the segments, being disposed with respect to the faces at less than a right angle, allowing for the minimum diameter of the cylinder being welded.

It will be evident that the construction of FIGURES 3 to 7 can be opened at any link by removing two screws 43 to separate the links from the cylindrical inserts, thus providing a segmented curvable bar of the desired length.

The segmented bar as shown, for example, in FIGURES 1 and 2, possesses the remarkable property of assuring high pressure contact of the segment holding the molten metal and molten slag in place without requiring close application of pressure means. In fact, a four-foot length of chain and segments as per the invention will successfully provide tightness anywhere along the length even though it is held only at the top and bottom links against the plates being welded.

FIGURE 8 shows a series of segments 25 and a chain 26 secured thereto which is anchored as by a yoke 46 at the top and by a yoke 47 at the bottom attached to the plates 48 at the joint being welded by any suitable clamping device, such as a magnetic clamp or by tack welding. Both the top and bottom links are thus prevented from moving away from the plates, although they may be permitted to slide vertically as long as the chain cannot fall. When cold, the combination of chain and segments hangs vertically with no pressure whatever against the plates 48 except at the top and bottom links, or if the arrangement is not vertical, at the two end links. There may even be a substantial separation between the plates 48 and the middle segments as suggested at 50 in FIGURE 9, the segments being slightly shorter than the pitch of the chain holding them (in one realization they were shorter by 0.006 inch allowing a one-inch spacing at 50 in the middle of a four-foot chain of concave configuration).

It should be remembered, however, that in the preferred embodiment, the segments are of copper or of copper base alloy, while the chain or support is of steel or the like. The effect of heat on the chain will be better visualized by reference to FIGURE 10 which shows a segmented bar according to FIGURES 1 and 2 in which both ends are held away from the plate, while some heating means, which is shown diagrammatically as the flame 51 of a torch 52 (but which in actual welding will be an electric arc or electric heating current), is used to heat up the segments at an intermediate point along their length. Because of unequal expansion of copper and steel, the bar forms an S-shape as shown, which is convex at the point of heating 53 and concave elsewhere. The heated block is now to the right of the vertical line drawn through both end blocks by a distance which depends on the design of the chain with respect to the permissible concave curvature it can take when cold.

Recognizing that the steel chain expands only about two-thirds as much as the copper blocks, the action is similar to what would occur in a bi-metallic strip of the character used in making thermostats and electrical thermometers.

It will be evident, however, that the free motion of the center portion of the segmented backing bar shown in FIGURE 10 does not take place because it is interfered with by the plates 48 adjacent the weld 49 and therefore, as shown in FIGURE 11, the most highly heated block 54, and those adjoining it exert a pressure against the plates 48 as shown by the arrow 55.

Assuming that the blocks and links are both of one inch length as in a 1-inch #80 standard roller chain, and assuming that the temperature elevation is 750° F., the expansion to be expected will be as follows:

|  | Inches |
|---|---|
| Copper blocks, $750 \times 9.1 \times 10^{-6}$ | 0.00682 |
| Steel chain, $750 \times 6.6 \times 10^{-6}$ | 0.00495 |
| Difference | 0.00187 |

See Kent, Mechanical Engineers' Handbook (12th ed.), 1–04, table 3.

This results in the rotation of one segment against the next by an angle "$a$" whose sine is $$\sin a = \frac{0.00187}{0.75} = 0.0025$$

where 0.75 is the distance between the rear face of the segment and the pin of the chain, and $$a = 0.1435 \text{ degree}$$

Since experimentally it is determined that six consecutive blocks undergo the heating, including the post weld heating below the point of welding, the upper cold portion of the segmented bar rotates with respect to the lower portion approximately $6 \times 0.1435 = 0.86$ degree.

This rotation is prevented by the plates and the chain must be forced back to straightness by a mechanical counterbend spread along its entire length as shown at 56 in FIGURE 11.

This means that the total elongation of the copper blocks which are heated ($6 \times 0.00187$ or 0.0114) must be compensated by a total elongation of 0.0114 inch of the steel links of the chain equally divided among the 48 inches of the chain.

One can draw an analogy therefore between this device and four modules each consisting of a flat steel bare of ¼ x ⅛-inch cross-section which has a total cross-section equal to 0.125 square inch. The elongation of 0.0114 inch in 48 inches of such a bar requires a tensile stress as follows:

$$\frac{P}{A} = \frac{e}{L} E$$

or $$\frac{0.0114}{48} 30 \times 10^6 \text{ p.s.i.} = 7{,}100 \text{ p.s.i.}$$

and $$P = 7{,}100 \times 0.125 = 890 \text{ pounds}$$

In the above equation the nomenclature is as follows:

P=load in pounds
A=area in square inches
L=length in inches
E=modulus of elasticity in tension of steel In FIGURE 12 the chain is shown as simulated by two solid bars 57 engaging the segment 25 at the top and bottom and bridged by a tension member 58. The pressure $p$, which is the resultant outward pressure of the segment against the work at right angle to the compressive stress along the length of the segment, on the hottest block, therefore is $$2 \times 890 \frac{0.75}{24} = 55.5 \text{ pounds}$$

In reality the steel links do not reach a temperature as high as the segments, since they radiate heat externally by large and thin surfaces. If we assume that instead of reaching 750° F. the steel links opposite the weld reach a temperature of only 375° F., the difference in elongation becomes

|  | Inch |
|---|---|
| Copper blocks | 0.00682 |
| Steel links | 0.00247 |
| Difference | 0.00435 | and $$p = 55.5 \frac{0.00435}{0.00187} = 130 \text{ pounds}$$

The pressure will be the same at other locations than the middle of the segmented bar combination shown in FIGURE 12 because, if the equivalent levers change their lengths, one increases and the other decreases, and the total action of the hot block is the same.

As the weld progresses upwardly, the point of pressure also rises and stays level with the molten metal, where the pressure is needed to seal against runouts. Other segments above and below the segment opposite the welds are not pressed tight on the plates and this means that those segments will not stick fast. Fortunately the pressure effect is so pronounced that concave bends in the plates at their back faces will still receive good contacting pressure at the time and place where the contact is needed.

A cold deviation of one inch in the middle of a four foot segmented bar has proved to be satisfactory but this could be reduced if a higher pressure is desired. The proper degree of concave cold curvature is obtained by dimensioning the blocks shorter than the pitch of the chain so that some bending is permitted in the chain when the blocks are in mutual contact.

The principles of the invention can be used not only in welding plates from a single side or by a single pass, but also for double pass vertical welding where the plates 48 are chamfered at 60 at both sides to form what is called an X or double-V preparation, (FIGURE 14). It is sometimes preferred to weld a first pass on one half of the thickness of the plate and to complete the welding of the second half by a separate operation. In such a case, the narrow gap between the plates at mid-thickness 61 must be closed temporarily to retain the molten metal and the slag of the weld pool from running out into the chamfer of the second pass. For this purpose a modified form of the segmented weld backing bar of FIGURES 1 and 2 is employed, the segments $25^2$ each having nose portions 62 which conform to the shape of the chamfer. It will be evident that the prominence of each nose portion 62 in the stack of segments may cause excessive opening between the segments when the chain has to bend to accommodate surface irregularities of the plates 48, and molten metal may then leak between the separated segments.

One method of overcoming the difficulty consists in replacing the roller chain, which is rather far from the nose tips, by flexible cables 63 and 64 (FIGURES 15, 16) which pass through longitudinal openings 65 and 66 in nose-shaped segments $25^3$ having sides 67 which conform generally to the chamfer. In this case the hard steel cable 63 can pass through the segments $25^3$ at a distance from the ends of the noses which is no greater than the distance between the active face of the segments 25 and the pins of the chain. The second cable 64 prevents the segments from rotating around the first cable. In this way the nose tips of all segments are kept in fair alignment, while limited flexibility is retained in all directions. The rear abutting end of each block tapers at 68 to permit curving the stack of blocks slightly without opening the nose tip contacts excessively. The axis of mutual rotation of two successive blocks is preferably located at the cable 63.

If the two cables are substantially longer than the length of the stack of blocks enclosed within the length of the cable as shown in FIGURE 17, length adjustment of the stack of segments to fit the weld joint can be made by simply lifting unused segments 70 above the stack of used segments 71 and letting the unused segments form a second set of unused segments hanging down behind the used segments, with sharp bending of both cables at 72 at the top of the used stack of segments. In addition to saving time in a change of active length, the sharp bend of the cables at the top at 72 restrains against block separation during the welding operation.

It will be evident that if the segments are to be of metal, it is highly desirable to make them of a highly conductive metal such as copper or copper base alloy. On the other hand the segments can be made of a refractory material such as magnesia, silica, alumina, chrome or fireclay, in which case suitable modification will be made of the fastening means to the chains where required.

In view of my invention and disclosure variations and modifications to meet individual whim or particular need will doubtless become evident to others skilled in the art to obtain all or part of the benefits of my invention without copying the structure shown, and I therefore claim all such insofar as they fall within the reasonable spirit and scope of my claims.

Having thus described my invention what I claim as new and desire to secure by Letters Patent is:

1. A segmented weld backing bar for supporting weld metal and slag in joining metallic plates by fusion welding, comprising a series of articulated segments laterally in contact, and a chain extending along one side of the segments and having links supporting the segments permitting limited flexibility to accommodate deviations in the metallic plates and retain liquid tightness of molten weld metal or slag, the segments being of a metal of relatively higher thermal expansion and the chain being of a metal of relatively lower thermal expansion, whereby the chain when secured against the plates exerts lateral pressure against the plates.

2. A backing bar of claim 1, in which the chain is made of steel and the segments are made of copper.

3. A backing bar of claim 2, in which the segments are slightly shorter than the pitch of the chain and permit concave curvature of the chain.

4. A backing bar of claim 1, in which the metal plates form a chamfer, and in which the segments are nose shaped to fit the chamfer.

5. A backing bar of claim 1, in which the segments include longitudinal openings and the support includes a plurality of steel cables passing through the openings to assure alignment of the segments while permitting limited bending of the assembly.

6. A backing bar of claim 5, in which the cables are substantially longer than the stack of segments to permit sharp bending of the cables at any point along their length with separation of the stack of segments at said bending point.

7. A backing bar of claim 1, in which the segments have at each side of each end an arcuate groove extending approximately a quadrant and the links have at each end a tubular pivot insert entering the arcuate grooves of two adjoining segments and holding the segments in place while permitting them to pivot.

8. A backing bar of claim 1, in combination with means pressing the chain at opposite ends against the plates.

References Cited

UNITED STATES PATENTS

| | | | |
|---|---|---|---|
| 2,430,266 | 11/1947 | Zimmerman | 228—50 |
| 2,792,799 | 5/1957 | Dahlstrom | 228—50 |
| 2,010,155 | 8/1935 | Hull | 228—50 |

RICHARD H. EANES, JR., *Primary Examiner.*